Patented Dec. 21, 1943

2,337,398

UNITED STATES PATENT OFFICE 2,337,398

PROCESS FOR IMPROVING THE WEAR RESISTANCE OF TEXTILE MATERIALS

John Thompson Marsh and William Hilton Roscoe, Manchester, England, assignors to Tootal Broadhurst Lee Company Limited, Manchester, England, a British company No Drawing. Application September 7, 1940, Serial No. 355,820. In Great Britain September 15, 1939

2 Claims. (Cl. 260—9)

This invention relates to the manufacture of extruded products of regenerated cellulose such as artificial filaments, staple fibres, ribbon, bristles, horse-hair, films, and the like, from alkaline viscose solutions, and to spinnable solutions suitable therefor.

The principal object of the present invention is to improve the wear resistance of such extruded products. Other objects will appear hereafter.

It has been suggested to add condensation products to artificial silk spinning solutions and also to add substances capable of forming synthetic resins, or such substances in a partially condensed state, when it is moreover, necessary to complete the hardening by further condensation after formation of the thread, film and so on. These substances are generally formed by a process of condensation, such as the well-known phenol formaldehyde or urea formaldehyde reaction. Such resins are usually unsuitable because of their brittleness. Phenol-formaldehyde and glyptal resins are coloured or readily discolour, while urea formaldehyde resin is decomposed by alkali.

Natural rubber latex does not give satisfactory results, since apart from the difficulty of producing homogeneous solutions the product gradually becomes harder with the passage of time and is not fast to light.

The synthetic rubber-like materials may be polymers, co-polymers, emulsion polymers or hetero-polymers of various acrylic derivatives such as acrylic or methacrylic acid esters, or acrylic or methacrylic acids.

An important feature of the polymerized esters according to the invention is that they are insoluble in the acid of the coagulating bath and provided the mixture is allowed to stand they are completely miscible with viscose.

For the purpose of this invention, the term "synthetic rubber-like polymers" includes those synthetic resins which possess rubber-like properties as opposed to those which resemble natural resins, glass or porcelain in their physical properties, being characterized by a high degree of brittleness.

We prefer that the synthetic rubber-like polymer should be completely miscible with the spinnable solution with which it is incorporated to form a homogeneous solution.

The present invention is not concerned with the condensation type of resinification as exemplified by the urea formaldehyde or phenol-formaldehyde reaction, but only with the polymerization type of product which is obtained by a monomeric substance such as an alkyl acrylate building itself up into a synthetic rubber-like polymer in virtue of the unsaturated linkage contained in the monomer.

The properties of the synthetic rubber-like materials may be varied according to the extent of polymerization, the nature of the ester grouping and the alkyl substituent.

The esters of acrylic or alkacrylic acids provide suitable material for incorporating in the viscose solution as a large number of these polymers, co-polymers, hetero-polymers and emulsion polymers are commercially available and sold under trade names, such as Plextol, Rhoplex, Methacrol, Acronal, Igeplast, Plexigum, Acrysol, etc. In many cases it is also possible to obtain different properties from the acrylate type of polymer when it is prepared as an emulsion polymer.

One great difficulty in adding substances to viscose solutions arises from the necessity of obtaining homogeneous solutions for spinning. This difficulty is overcome by the present invention.

When these emulsion polymers of acrylic acid esters are made alkaline, as for example when added to the viscose solution, they are rapidly coagulated, but if the mixture is allowed to stand it slowly passes into solution. The acrylic acid type of polymer dissolves more easily than its esters, but does not necessarily give the same result owing to the different physical properties in the parent ester before hydrolysis which, as indicated above, may be determined by the degree of polymerization and the effect of the ester grouping which need not be entirely removed for complete miscibility with the alkaline viscose solution. Particularly valuable results are obtained by the use of polymerized esters with alkaline viscose solutions since the products of hydrolysis of the esters readily give polymers of suitable ranges of molecular weight.

Alternatively, it is possible to add dilute caustic alkali to the emulsion polymer which is then coagulated and later passes into solution and this alkaline solution may then be added to the viscose solution.

A suitable range of proportions is 2½–7½% by weight of polymer calculated on the weight of cellulose but the invention is not so limited.

In the case of polyacrylic acid dissolved in caustic soda and added to a viscose spinning solution, this free acid is soluble in water but may be rendered insoluble by treatment with aluminium acetate.

Example I

In one method of carrying out the invention, 120 gms. of wood pulp in the form of sheets are steeped for 1½ hours in 18% NaOH solution. The sheets are then subjected to a pressure of 650 lbs. per square inch for 3 minutes and then shredded. After ageing at 20° C. for 2 days the crumbs are revolved in a churn for 3-4 hours with 48 gms. $CS_2$ and the resulting product dissolved in 500 gms. of 4% NaOH. 400 gms. viscose (10.5% cellulose content) are mixed with 64 gms. of a solution of the emulsion sold under the trade-name Plextol D1, and 60 gms. of water. The Plextol D1 solution is made by adding 25 gms. Plextol D1 emulsion in 175 gms. of an aqueous solution containing 7% NaOH and allowing to stand until solution occurs. Alternatively, the mixture of Plextol D1 and NaOH solution may be added immediately to the viscose which must then be allowed to stand until a homogeneous product is obtained. The mixture is then ripened as usual and spun at ripening Nos. 8-10 into a bath of composition 10% $H_2SO_4$, 1% $ZnSO_4$, 18% $Na_2SO_4$, maintained at a temperature of 42-52° C. Owing to the truly thermoplastic nature of many of these synthetic rubber-like materials it is possible to bring about a definite measure of deformation of the filaments or films prepared in the above manner and these deformations may conveniently take the form of crinkles to produce an effect similar to the crinkled nature in woollen hairs. The deformation may be done by any known means such as goffering and may be carried out as soon as possible after coagulation of the cellulose; the crinkled effect may be assisted by carrying out the deformation at an elevated temperature, say up to 150° C., though we are not limited to these conditions which in some cases are determined by the type of synthetic rubber-like polymer employed.

Filaments prepared in the above manner had a manifold increase in resistance to abrasion as compared with filaments from the original viscose solution.

It will be noted that the amount of synthetic rubber-like polymer in the above example was 5% on the cellulose content of the viscose solution, the Plextol D1 emulsion containing 25% solid matter. A similar example with 10% of Plextol gave definitely stiff results which may be of value for artificial horse-hair for instance, or bristles.

Example II 360 gms. of viscose (10.5% cellulose content) are mixed with 38 gms. of a solution of the emulsion of polymerised ester being an acrylate derivative sold under the trade-name Rhoplex WC9, and 74 gms. of 4% NaOH. The Rhoplex WC9 solution is made by dissolving 40 gms. Rhoplex WC9 emulsion in 160 gms. of an aqueous solution containing 5% NaOH. The viscose is prepared as usual up to the spinning. It is spun into a bath of 25% sodium chloride maintained at a temperature of 45-50° C. The yarns obtained from spinning are washed and, before allowing to dry, they are passed through goffering rollers, heated to, e. g., 105-150° C. They are then processed in the usual manner.

Example III 400 gms. of viscose (10.2% cellulose content) are mixed with 41 gms. of a solution of the emulsion of polymerised ester being an acrylate derivative sold under the trade-name Acrysol C9 and 70 gms. 4% NaOH. The Acrysol solution is made by dissolving 20 gms. Acrysol C9 emulsion in 80 gms. of an aqueous solution containing 5% NaOH.

The viscose solution is then ripened as usual and spun into the acid bath in the usual manner.

Example IV 360 gms. viscose (10.5% cellulose content) are mixed with 7.5 gms. of the emulsion sold under the trade name Rhoplex W66 and 105 gms. of an aqueous solution containing 4% NaOH and allowed to stand until a homogeneous product is obtained. The solution is then ripened and spun in the usual manner into the acid bath.

Example V 400 gms. of viscose of 11.5% cellulose content were mixed with 9 gms. of emulsified polymerized alkyl methacrylate (e. g., the product sold with the trade name of Plextol D1) in 167 gms. of 4.5% aqueous solution of caustic soda, and allowed to stand until a homogeneous product was obtained. This was spun into a usual sulphuric acid spinning bath and the threads finished in the customary manner.

Example VI 400 gms. viscose (10% cellulose content) are mixed with 40 gms. of a solution of an emulsion of ethylpolyacrylate and 60 gms. of 4% caustic soda. The polyethylacrylate solution is made by dissolving 40 gms. of a 25% emulsion of polyethylacrylate in 162 gms. of 10% caustic soda solution.

We declare that what we claim is:

1. Process of producing a spinnable solution which comprises incorporating in an alkaline viscose solution an aqueous dispersion of a polymerised alkyl ester of an acid selected from the group consisting of acrylic acid and methacrylic acid and bringing the mixture so obtained into a homogeneous state by allowing the ester to stand in presence of the dilute alkali until a homogeneous dispersion is obtained.

2. Regenerated cellulose having improved wearing qualities comprising filaments containing a rubber-like polymer of an alkyl ester of an acid selected from the group consisting of acrylic acid and methacrylic acid distributed within the filament and obtained by spinning and coagulating the solution of claim 1.

JOHN THOMPSON MARSH.
WILLIAM HILTON ROSCOE.